(12) United States Patent  
Levi

(10) Patent No.: US 9,415,726 B2  
(45) Date of Patent: Aug. 16, 2016

(54) VEHICLE LADDER RACK APPARATUS AND METHOD OF USE

(76) Inventor: Avraham Y. Levi, Eagan, MN (US)

(*) Notice: Subject to any disclaimer, the term of this patent is extended or adjusted under 35 U.S.C. 154(b) by 400 days.

(21) Appl. No.: 13/817,484

(22) PCT Filed: Sep. 28, 2010

(86) PCT No.: PCT/US2010/050501  
§ 371 (c)(1),  
(2), (4) Date: Oct. 3, 2013

(87) PCT Pub. No.: WO2012/044280  
PCT Pub. Date: Apr. 5, 2012

(65) Prior Publication Data  
US 2014/0030054 A1    Jan. 30, 2014

(51) Int. Cl.  
*B60R 9/042* (2006.01)  
*B60R 9/048* (2006.01)

(52) U.S. Cl.  
CPC ............. *B60R 9/0423* (2013.01); *B60R 9/0485* (2013.01)

(58) Field of Classification Search  
CPC .......... B60R 9/06; B60R 9/042; B60P 3/1025  
See application file for complete search history.

(56) References Cited

U.S. PATENT DOCUMENTS

| | | | |
|---|---|---|---|
| 5,297,912 A | 3/1994 | Levi | |
| 5,398,778 A * | 3/1995 | Sexton | 182/127 |
| 5,884,824 A * | 3/1999 | Spring, Jr. | 224/310 |
| 6,092,972 A | 7/2000 | Levi | |
| 6,099,231 A | 8/2000 | Levi | |
| 6,315,181 B1 * | 11/2001 | Bradley et al. | 224/310 |
| 6,427,889 B1 | 8/2002 | Levi | |
| 6,764,268 B2 | 7/2004 | Levi | |
| 6,971,563 B2 | 12/2005 | Levi | |
| 8,100,306 B2 * | 1/2012 | Gerhardt et al. | 224/320 |
| 2009/0140021 A1 * | 6/2009 | Richter et al. | 224/310 |

* cited by examiner

*Primary Examiner* — Ernesto Suarez  
*Assistant Examiner* — Emery Hassan  
(74) *Attorney, Agent, or Firm* — Nikolai & Mersereau, P.A; Thomas J. Nikolai

(57) ABSTRACT

Apparatus for facilitating the loading and unloading of heavy ladders from the roof of a motor vehicle comprises a pair of crossbar members affixed to the roof of the vehicle that extend transversely to the length dimension of the vehicle. A four-bar linkage arrangement affixed to the rearmost crossbar member is adapted to be driven by a shaft journaled for rotation in the spaced-apart crossbar members is arranged to displace a ladder support bar to which ladder hooks are attached. A front ladder hook is attached by a coupler to the elongated shaft at the forward facing end of the ladder rack assembly where the coupler is designed to allow the shaft to be rotated through a predetermined angle before the front ladder hook will rotate with the shaft and in this way the front and rear hooks remain parallel to one another through their range of motions.

10 Claims, 8 Drawing Sheets

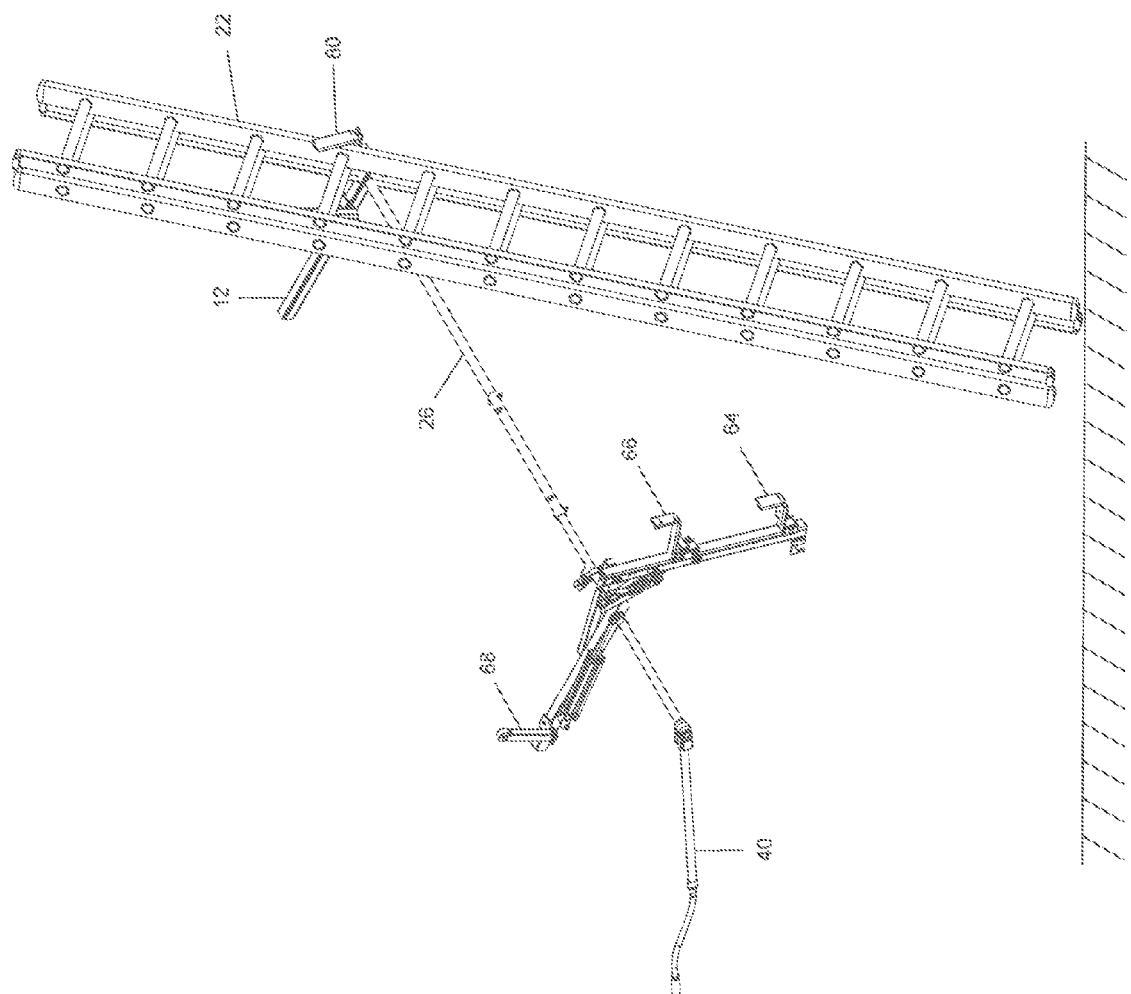

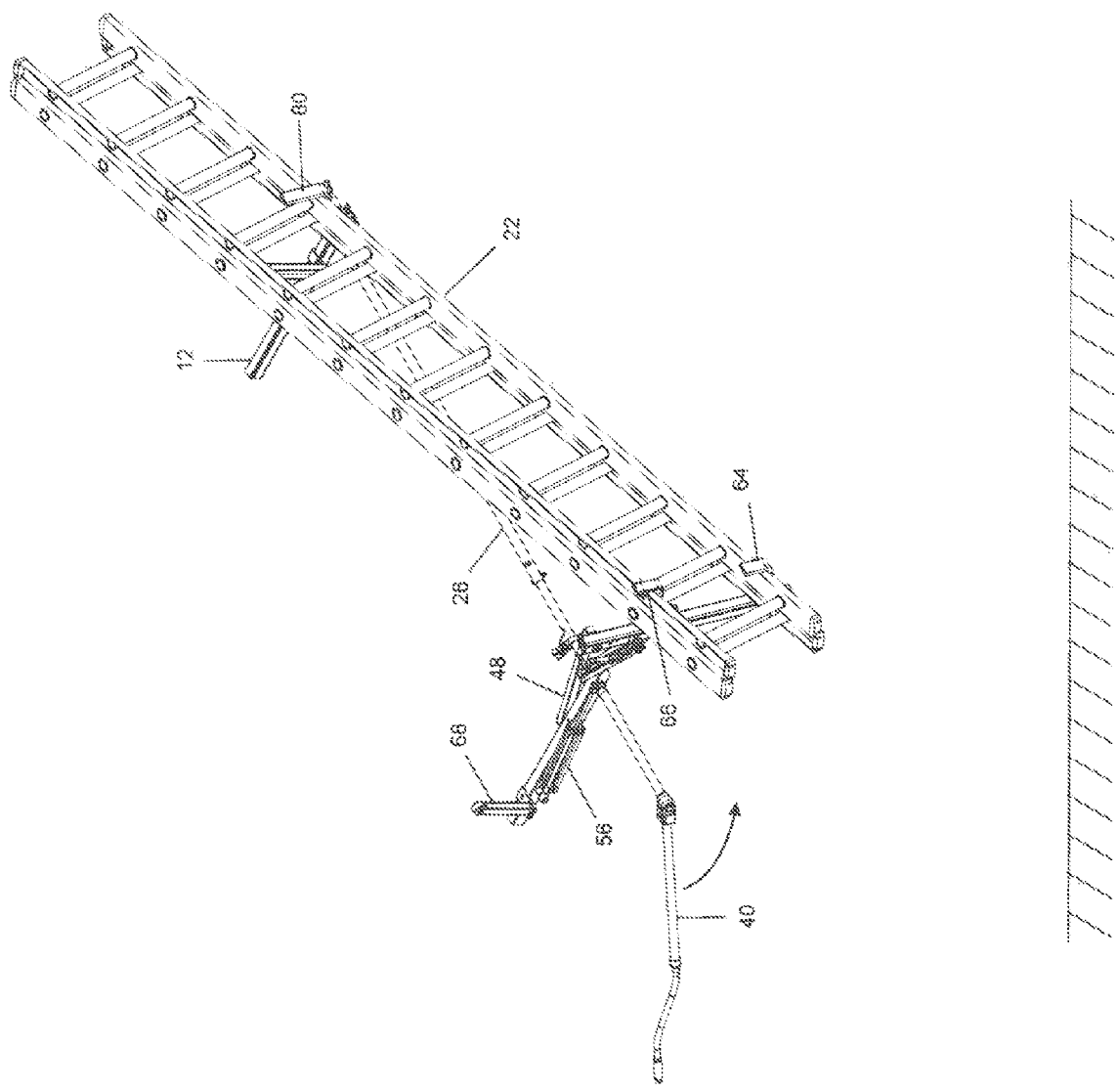

VEHICLE LADDER RACK APPARATUS AND METHOD OF USE

BACKGROUND OF THE INVENTION

I. Cross-Reference to Related Application

This application is a 371 of International application no. PCT/US2010/050501, filed Sep. 28, 2010, and claims priority from that application which is also deemed incorporated by reference in its entirety in this application II. Field of the Invention The present invention relates generally to vehicle-mounted roof racks for transporting loads, and more particularly to a movable ladder rack that can be used to readily load a ladder onto the roof area of a truck or van and to lower it from the roof area to a position allowing the ladder to be manually carried away to a worksite.

III. Discussion of the Prior Art

In my earlier U.S. Pat. Nos. 5,297,912; 6,092,972; 6,099,231; and 6,427,889, the teachings of which are hereby incorporated by reference, there are described different designs of truck or van-mounted ladder racks that facilitate the loading and unloading of one or more ladders with respect to the vehicle's roof. These devices comprise front and rear four-bar linkage assemblies that include a stationary member which is adapted to rigidly affixed to the vehicle's roof or to crossmembers that clamp to the vehicle's roof, and a ladder support member pivotally joined to the stationary member by a pair of transversely spaced links. A drive shaft is journaled for rotation in the stationary members of the front and rear four-bar linkage assemblies and is rigidly affixed to one of the pair of links of the front and rear four-bar linkage assemblies. Thus, when the drive shaft is rotated, either manually with a crank or automatically by means of a motor, ladders resting on the front and rear ladder support members are lifted and rotated from a position parallel to the vehicle's roof to a position parallel to the vehicle's side during an unloading maneuver. When reloading ladders onto the vehicle, the drive shaft is rotated in an opposite direction to raise and rotate the ladder load onto the vehicle's roof.

In my earlier designs described in the aforereferenced patents, the four-bar linkages have been designed such that the top and foot of the ladders remain generally horizontal throughout their range of motion as the drive shaft is rotated.

While the earlier designs reflected in the above-listed patents greatly simplify the loading and unloading of heavy extension ladders onto and from transport vehicles, it is deemed advantageous to provide a rotatable ladder rack assembly for a motor vehicle that requires less force to be applied during the unloading and reloading operations. My U.S. Pat. No. 6,764,268 describes a ladder rack arrangement in which the frontmost four-bar linkage assembly allows a ladder to be transferred from the vehicle's roof to a position alongside the vehicle where the upper end of the ladder is at a raised elevation relative to the ladder's foot such that the ladder is inclined relative to the horizontal. The height drop from the rooftop position to its lowered disposition is reduced such that less force is required to operate the ladder rack. Furthermore, with the inclined position, the ladder feet are lowered further such that a workman is better able to grasp the ladder at its foot end while the top or front end of the ladder is still engaged and supported by the front ladder support member. This permits the foot of the ladder to be lifted free of the rear ladder support member and lowered to the ground with the top end of the ladder still being supported by the front ladder support member. This also reduces the manual effort and ultimately standing the ladder vertically.

With the arrangement described in the aforereferenced U.S. Pat. No. 6,764,268, the contents of which are hereby incorporated by reference, it is still necessary for the user to manually lift the front end of the ladder to loop its upper rail onto the hook arm 41 followed by the step of lifting the rear end of the ladder so that its upper rail is cradled by the hook arm 19 on the rear four-bar linkage assembly. This has proved to be somewhat challenging for users having limited upper body strength.

It is a purpose of the present invention to provide a movable ladder rack assembly that eliminates the foregoing drawback of the ladder rack described in my '268 patent.

SUMMARY OF THE INVENTION

The present invention comprises a ladder rack for a motor vehicle to facilitate the loading and unloading of ladders onto and from the roof area of the vehicle. It comprises a front and a rear crossbar member that is attachable to the roof of a motor vehicle in parallel, spaced-apart relation where the crossbar members extend transversely to a longitudinal axis of the motor vehicle. An elongated shaft extends between the front and rear crossbar members and is journaled for rotation therein. A four-bar linkage, including a rear ladder support bar that is pivotally joined by a first link member to the rear crossbar member and by a second link member to the elongated shaft such that rotation of the shaft in a first direction displaces the ladder support bar to a ladder loading and unloading position alongside the motor vehicle and rotation of the shaft in a second direction displaces the ladder support bar from the ladder loading and unloading position to a position atop the vehicle's roof area. At least one, and preferably two, rear ladder hooks are affixed to the rear ladder support bar. Completing the assembly is a front ladder hook that is affixed to and rotatable with the elongated shaft adjacent to the front crossbar by a coupler that is operative to maintain the front ladder hook parallel with the rear ladder hooks on the rear ladder support bar over a path of travel of each upon rotation of the shaft.

In accordance with the present invention, I have eliminated the front most four-bar linkage assembly and replaced it with a simple L-shaped hook that is joined to the rotatable elongated shaft by a specially designed coupler that ensures that the front hook and the hooks on the rear four-bar linkage assembly remain in a parallel relationship during their entire path of travel between a rooftop position and a position straddling the vehicle's side. A person wishing to load a ladder onto the vehicle's roof must merely lean the ladder against the rotatable elongated shaft and then push the ladder from its side to cause the upper portion of the ladder to tip and slide along the elongated shaft toward the front of the vehicle until the forward facing ladder rail abuts the front hook. At this point the ladder will be inclined to the vertical with the foot of the forward facing ladder rail still resting on the ground. The user may then lift the lower end of the ladder to hook one or both of the ladder rails onto the ladder hooks affixed to the rear ladder support bar of the rear four-bar linkage. Once this is done, the user may manipulate the crank arm to rotate the elongated shaft and thereby raise the ladder load to the roof area of the vehicle.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

FIGS. 7 and 8, along with FIG. 1, illustrate the method used to raise an extension ladder onto the roof area of a work vehicle using the ladder rack assembly of the present invention.

DESCRIPTION OF THE PREFERRED EMBODIMENT

Figure 1:
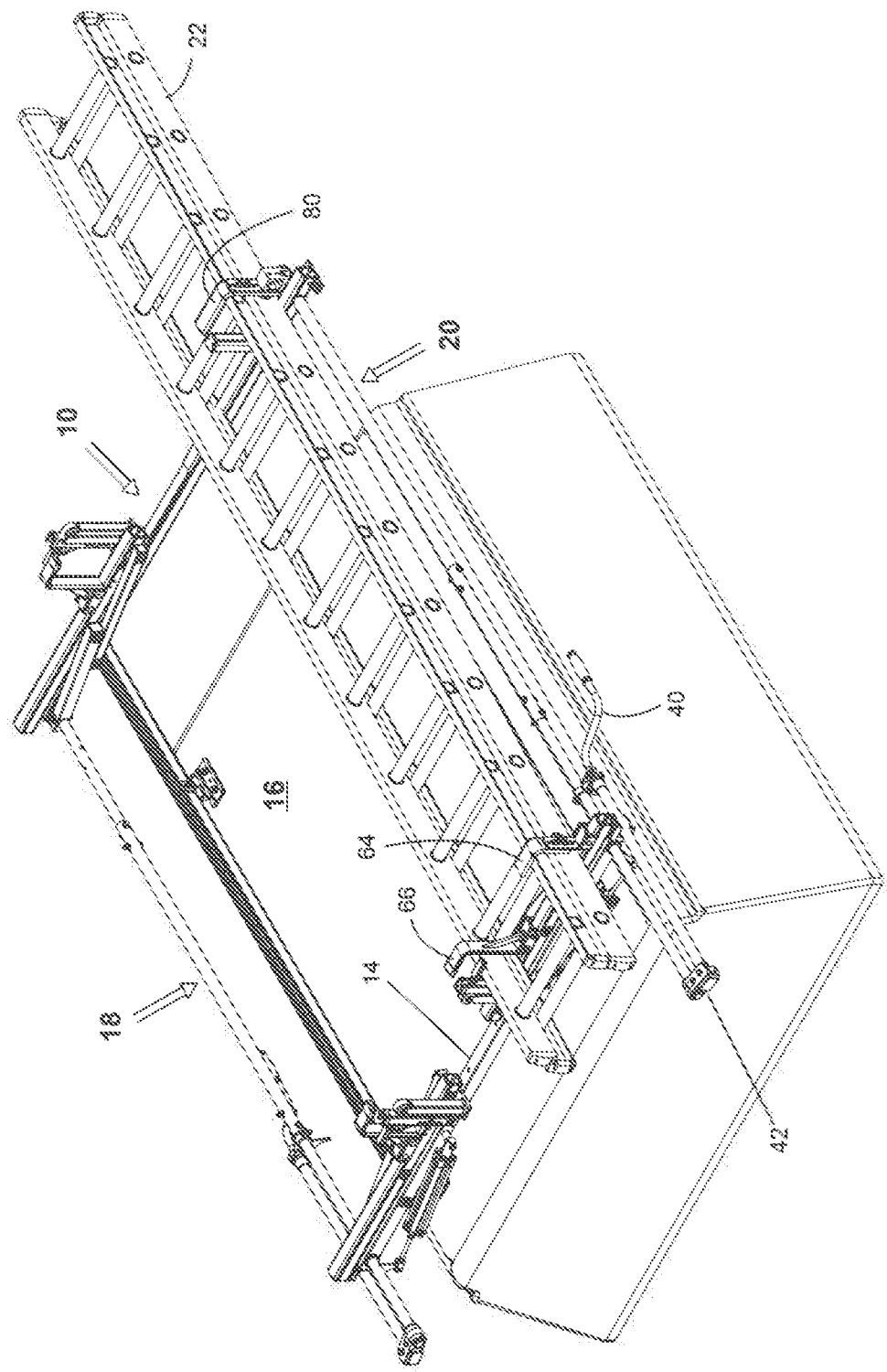
FIG. 1 is a perspective view of a cap or topper for a pick-up truck type work vehicle having the ladder rack of the present invention affixed to the roof area thereof.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of the description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressly described otherwise.

Keeping the above in mind and turning now to FIG. 1, there is indicated generally by numeral 10 a vehicle ladder rack constructed in accordance with the present invention. It is seen to comprise a front crossbar member 12 and a rear crossbar member 14 that are attachable to the roof 16 of a motor vehicle, such as a truck or van. The front and rear crossbar members 12, 14 are in parallel, spaced-apart relation and extend transversely to the longitudinal axis of the motor vehicle. In the view of FIG. 1, left and right ladder racks 18 and 20 are mounted to the crossbar members 12 and 14 with the ladder rack assembly 20 shown as containing an extension ladder 22 of conventional design.

Figure 2:
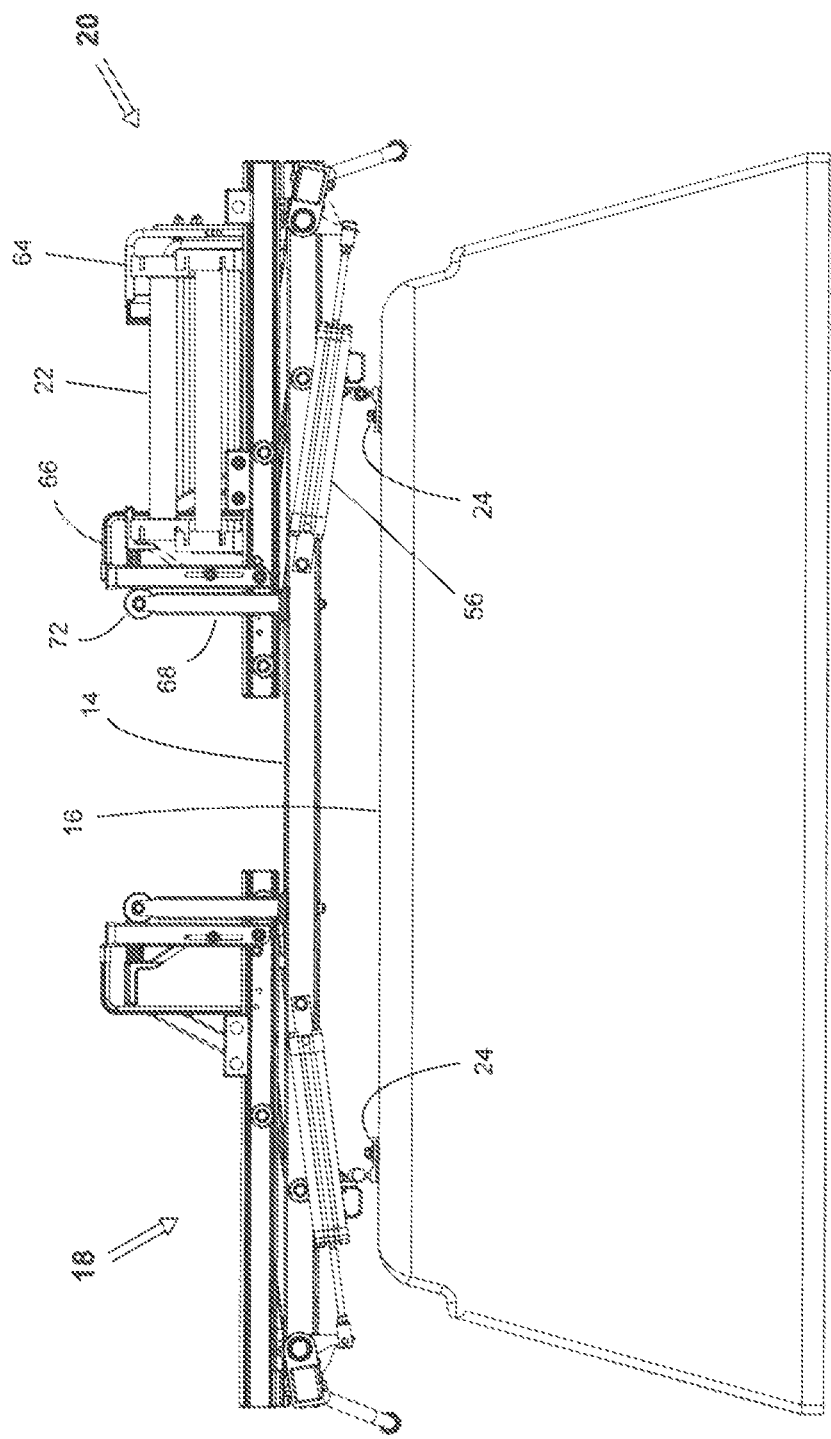
FIG. 2 is a rear view of the assembly of FIG. 1.

FIG. 2 is a rear view of FIG. 1 and shows the rear crossbar member 14 being affixed to the roof 16 of the vehicle by mounting brackets 24. The front crossbar member is similarly attached to the vehicle's roof.

Figure 3:
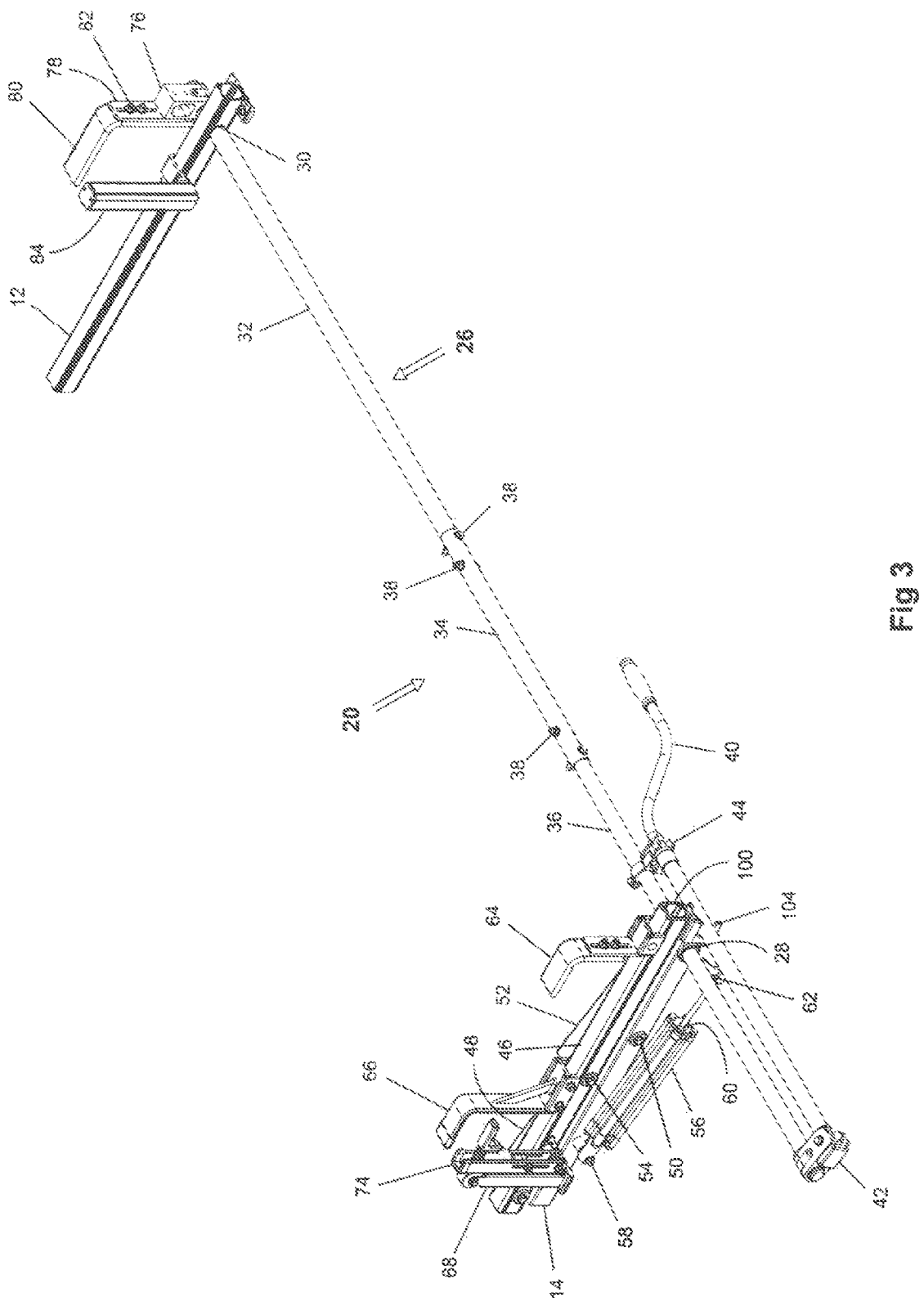
FIG. 3 is a perspective view of one-half of the ladder rack assembly shown in FIG. 1 with that segment in its closed condition.

FIG. 3 shows the ladder rack segment 20 by itself and without the ladder included so as not to obscure the working parts of the assembly. As seen in FIG. 3, an elongated shaft 26 extends between the front crossbar member 12 and the rear crossbar member 14 and is journaled for rotation in these crossbar members by bushings as at 28 and 30. In order to adapt the ladder rack to a variety of vehicles which may differ somewhat from model to model, it has been found expedient to make the elongated shaft 26 into segments as at 32, 34 and 36 which are joined together by telescoping ends secured by bolts 38 extending diametrically therethrough. The length of segment 34 may be chosen to suit the particular application.

The elongated shaft 26 is adapted to be rotated by a crank 40 that connects to the elongated shaft 26 at an articulated joint 42. In FIG. 3, the crank is shown in its latched position relative to the elongated shaft 26, the latch being identified by numeral 44. A padlock (not shown) may be used to secure the crank 40 in place to prevent unauthorized persons from actuating the ladder rack and removing a ladder therefrom.

Mounted to the rear crossbar member 14 is a four-bar linkage assembly that includes a rear ladder support bar 46 that is pivotally joined by a first link member 48 to the rear crossbar member by means of a hinge pin 50 and by a second link member 52 by a pin 54. The other end of link member 52 connects to an ear welded to the elongated shaft 26. The connection of the linkage 52 to the shaft 26 is obscured from view in FIG. 3 but those skilled in the art can appreciate that when the shaft 26 is rotated in a first direction, the linkage 52 will lift the ladder support member 46 and through kinematic action will move the ladder support member 46 to the end position illustrated in FIGS. 4 and 5 of the drawings.

A speed limiting air spring 56 is pivotally connected at one end by a pin 58 to the crossbar member 14 and its output rod 60 connects to a lever arm 62 that is welded to the elongated shaft 26.

Figure 4:
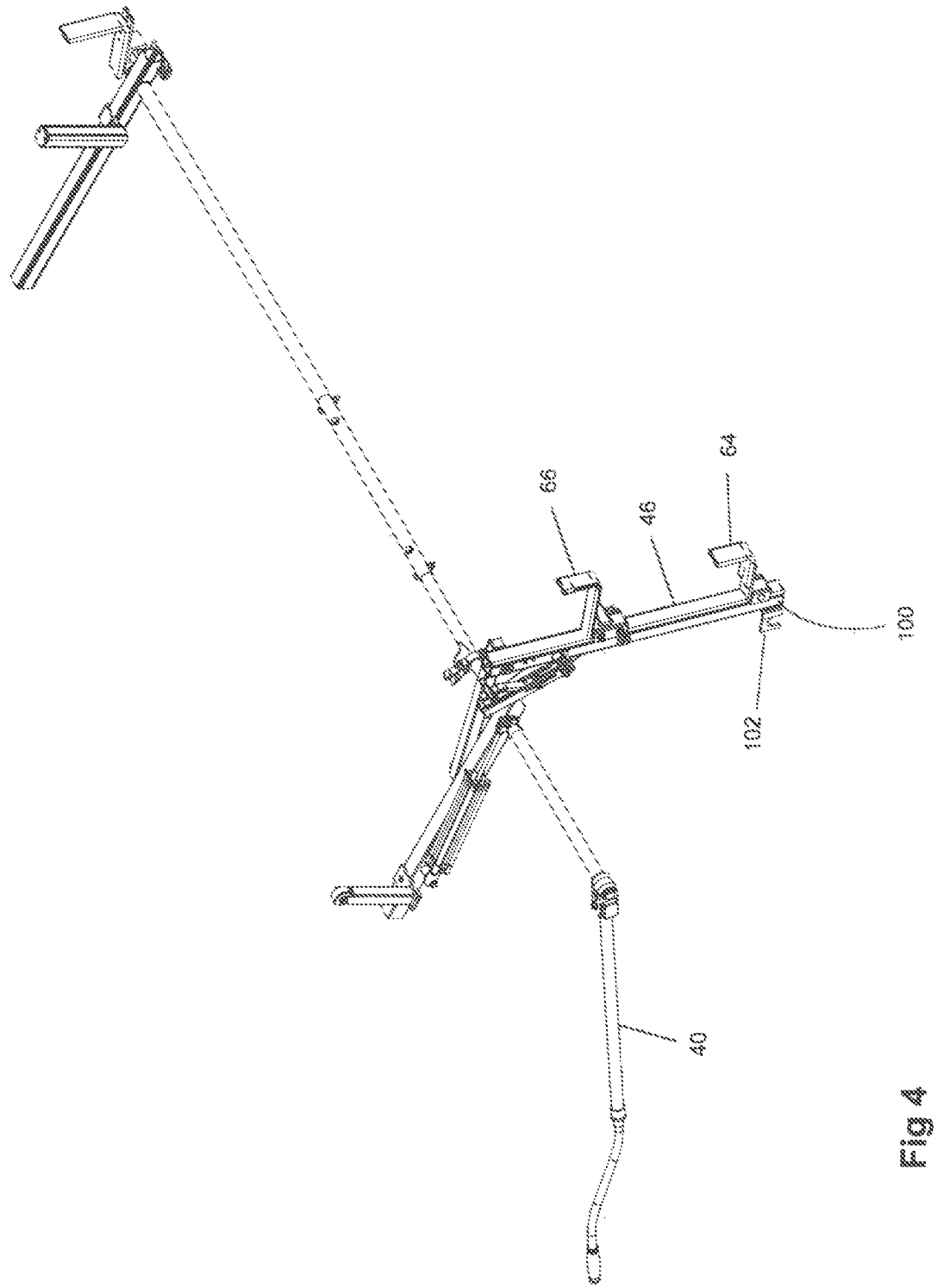
FIG. 4 is a perspective view of the ladder rack segment of FIG. 3 but shown in its open condition.

In FIG. 3, the ladder rack assembly is shown in its closed condition which it assumes when securing a ladder in place on the roof of the vehicle. FIG. 4 shows the same assembly in its open condition wherein a ladder being supported thereby would be in its ladder loading and unloading position along the side of the vehicle.

Bolted or otherwise attached to the ladder support bar 46 are hooks, as at 64 and 66, designed to cooperate with the rails of a ladder, the two hooks being spaced accordingly along the length of the ladder support bar 46.

Figure 5:
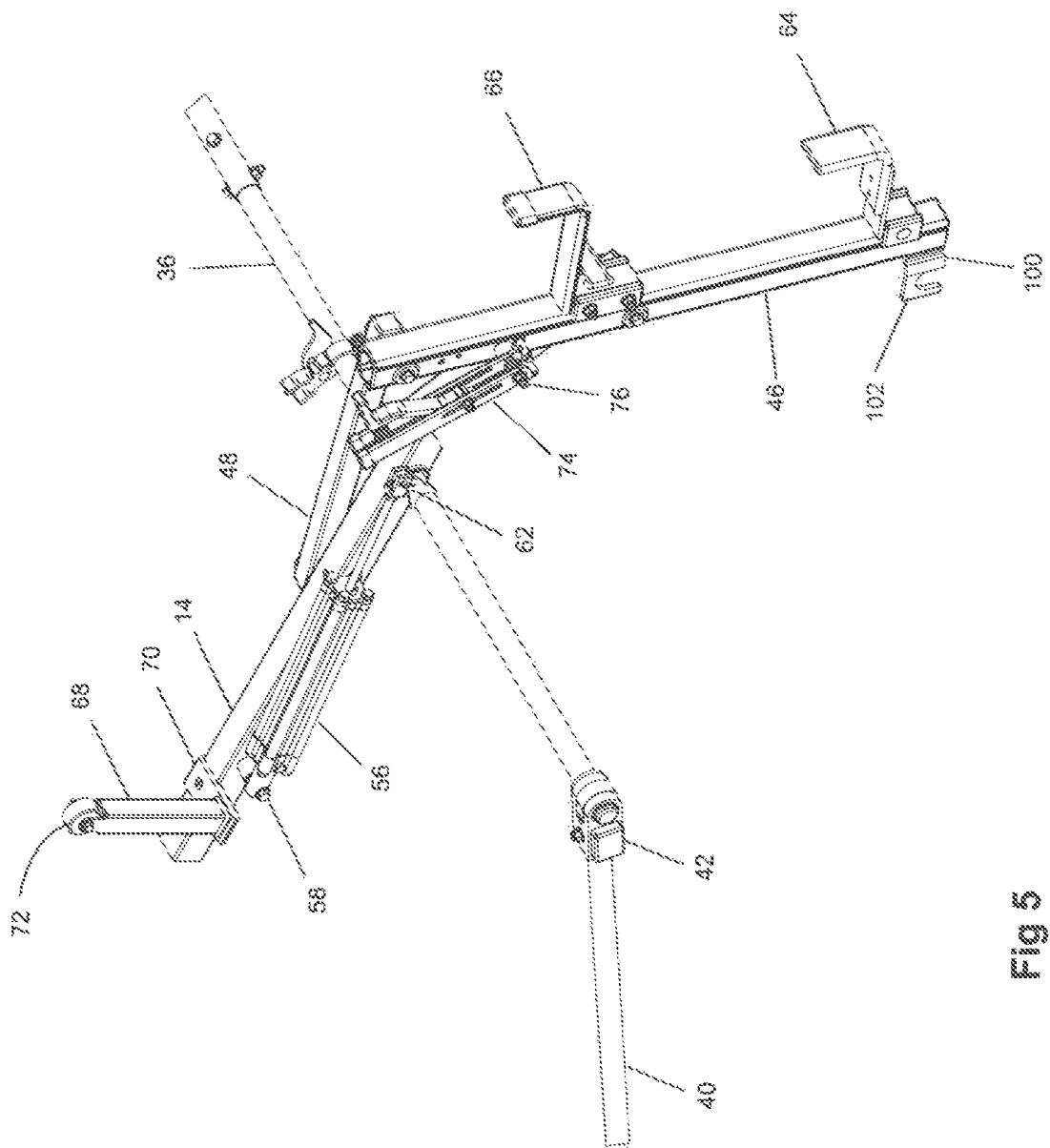
FIG. 5 is an enlarged view of the rear four-bar linkage assembly in its open condition.

With continued reference to FIGS. 3 and 5, also affixed to the rear crossbar member 14 is a generally vertically extending post 68 projecting up from a pedestal 70 that is bolted to the crossbar member 14. The post supports a roller 72 on the top thereof. The roller 72 is designed to cooperate with a ladder retainer 74 that is hinged to the ladder support bar 46 by a pin 76. As can be seen in FIG. 3, when the ladder rack assembly is in its closed disposition, the ladder retainer 74 will partially surround a rail of the ladder being carried by the hook 66. There, the rail is captured by the retainer 74 as it descends onto the vehicle's roof.

Figure 6:
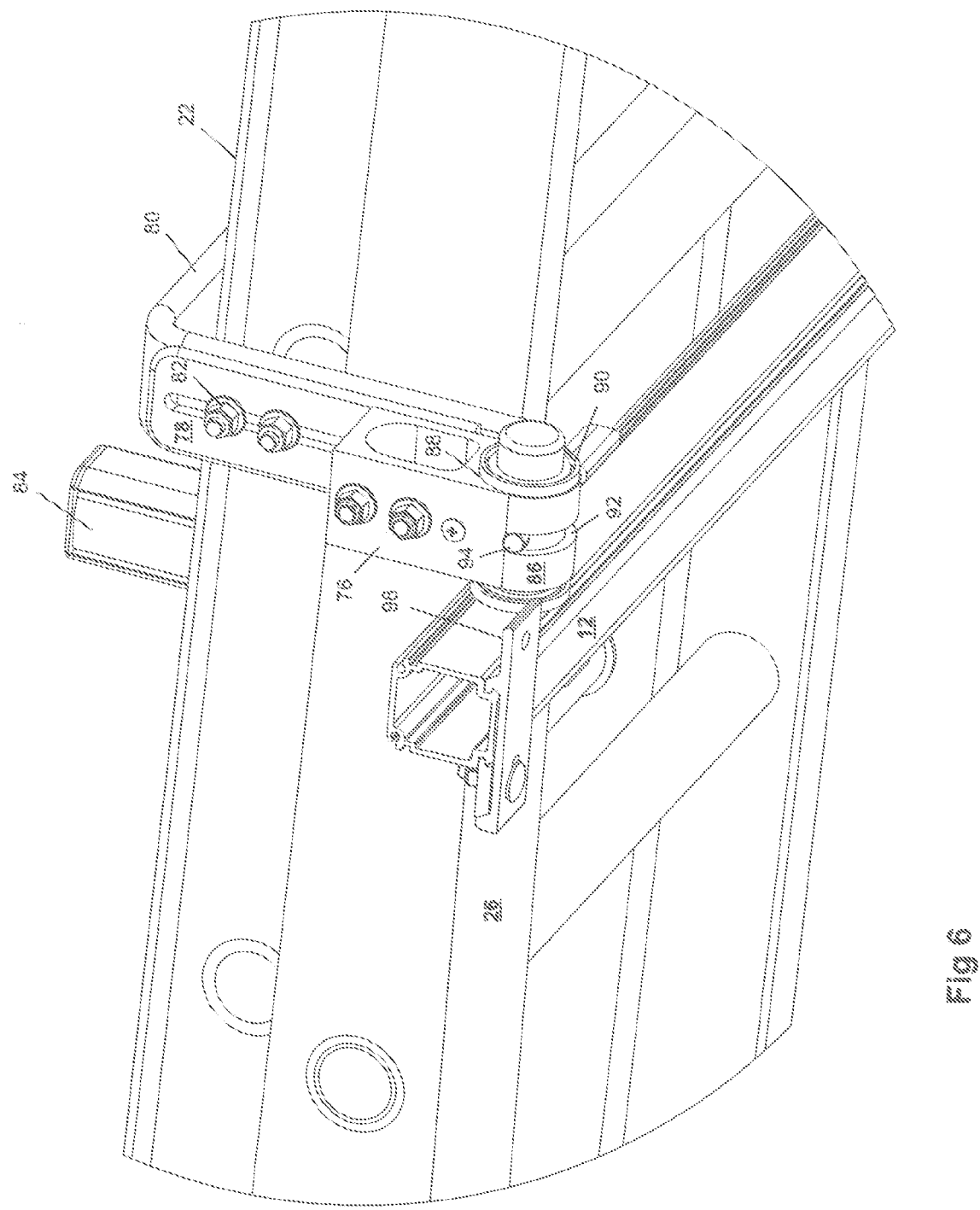
FIG. 6 is an enlarged perspective view showing the details of the coupler used for attaching the front hook member to the rotatable shaft and with the front hook assembly engaging ladder rails of an extension ladder.

Rather than employing a second four-bar linkage assembly at the front end of the ladder rack as in my earlier designs, there is attached to the end portion of the elongated shaft 26 that projects through the bushing 30 in the front crossbar member 12 a coupler block 76 to which is bolted a bracket 78. An L-shaped hook 80 is attached to the bracket 78 by fasteners 82 projecting through a vertical slot in the bracket 78. Thus, the elevation of the hook 80 relative to the crossbar member 12 is adjustable over a range to accommodate ladder rails of varying width dimension. The hook member 80 is designed to cooperate with a vertical post 84 that is clamped onto the front crossbar member when the assembly is in its closed condition to effectively enclose a ladder rail in the opening defined between the hook 80 and the post 84. FIG. 6 is a greatly enlarged perspective view taken from a point below the crossbar member 12 illustrating the shape of the coupler block 76 showing that it has an arcuate semicircular base portion 86 concentrically surrounding a bore 88 into which is fitted a bushing 90 for journaling the end of the elongated shaft 26 therein. The arcuate portion includes a groove 92 that extends through to the bore 88 and a pin 94 is swaged into the shaft 26 projects outward through the slot 92. The arcuate length of the slot 92 is such that the coupler 76 and its attached hook 80 will remain stationary until the shaft 26 is rotated to the point where the pin strikes or engages one or the other of the opposed ends of the slot 92 formed in the base 86 of the coupler. Without limitation, the slot length may be such that the shaft 26 may rotate about 130° before the hook 80 will begin to rotate with the shaft.

Also seen in FIG. 6 is a stop bar 98 which clamps to and projects laterally outward from a side surface of the crossbar member 12 that interact with the coupler 76 to limit the angle of rotation of the coupler and, therefore, the shaft 26. In this way, the front hook 80 can remain parallel to the rear hooks 64 and 66 through their path of travel as the shaft 26 is rotated in either a clockwise or a counterclockwise direction in moving a ladder between its loading/unloading position adjacent the side of the vehicle and the stowed position atop the vehicle's roof. With reference again to FIG. 3, it will be seen that there is clamped to the end of the extrusion comprising the ladder support member 46 a bracket 100 having legs 102 and 104 straddling the sides of the ladder support bar 46 and where the legs each include an inwardly extending arcuate recess for receiving the crank arm 40 therein when the crank arm is folded about the articulated joint 42 so as to extend parallel to the elongated shaft 26. Thus, when the latch 44 is secured by a padlock, the ladder support bar cannot be moved in a way that would allow anyone to remove the ladder from its stowed position atop the vehicle roof.

Referring next to FIGS. 7, 8 and 1 in that order, the steps involved in loading a ladder onto the roof area of a vehicle will next be explained.

A worker carrying the ladder 22 from a worksite to the vehicle will lean the ladder against the elongated shaft 26 with the bottom of the ladder on the ground. He or she will then slide the upper portion of the ladder along the shaft 26 until the rightmost ladder rail is received in the hook 80 as illustrated in FIG. 7. Following that, the worker will lift the ladder feet from the ground and position a lower portion of the ladder rails within the hooks 64 and 66 of the rear four-bar linkage when the ladder rack assembly 18 or 20 is in its open or loading/unloading position adjacent the side of the vehicle. This is the position represented by FIG. 8 of the drawings. Following that, the worker will grasp the crank handle 40 and rotate it in the counterclockwise direction as indicated by the arrow on FIG. 8 which rotates the shaft 26 so as to cause the linkages 48 and 52 to elevate and rotate the ladder support bar 46 to a top dead center position. At this point, further rotation of the crank 40 in the counterclockwise direction will bring the weight of the ladder load over center such that gravity will act against the force of the air spring 56 so that the ladder can be more gently lowered into the position shown in FIG. 1 of the drawings. Finally, the worker will fold the crank arm 40 into the clasp 44 and the bracket 100 such that a first ladder rail will be captured between the hook 80 and the post 84 at the front end of the ladder rack assembly while the other ladder rail will be lodged between the hook 66 and the post 74 to prevent shifting of the ladder load during transit.

Unloading of a ladder from the roof of the vehicle occurs in just the reverse order described for the ladder loading operation and need not be described herein in further detail.

Those skilled in the art will appreciate that the effort involved in proceeding from the step shown in FIG. 7 to that shown in FIG. 8 requires a reduced effort because the upper portion of the ladder extending beyond the hook 80 acts as a counterweight offsetting the force needed to lift the foot end of the ladder onto the hooks 64 and 66.

While there has been shown and described the preferred embodiment of the present invention, it is to be understood that the invention may be embodied otherwise than is herein specifically shown and described and that, within said embodiment, certain changes may be made in the form and arrangement of the parts without departing from the underlying idea or principles of the invention as set forth in the Claims appended herewith.

Having thus described my invention, what I claim as new, useful and non-obvious and accordingly, secure by a letters patent of the United States is:

1. A ladder rack for a motor vehicle to facilitate the loading and unloading of ladders onto and from the roof area of said Vehicle, comprising:
   a) a front and a rear crossbar member attachable to the roof of a motor vehicle in parallel, spaced-apart relation and extending transverse to a longitudinal axis of the motor vehicle;
   b) an elongated shaft extending between the front and rear crossbar members and journaled for rotation therein;
   c) a four-bar linkage including a rear ladder support bar pivotally joined by a first link member to the rear crossbar member and by a second link member to the elongated shaft such that rotation of the shaft in a first direction displaces the ladder support bar to a ladder loading and unloading position alongside of the motor vehicle and rotation of the shaft in a second direction displaces the ladder support bar from said ladder loading and unloading position to a position atop the vehicle roof area;
   d) at least one rear ladder hook affixed to the rear ladder support bar; and
   e) a front ladder hook affixed to and rotatable with the elongated shaft adjacent to the front crossbar by a coupler operative to maintain the front ladder hook parallel with the rear ladder hook on the rear ladder support bar over a path of travel of each upon rotation of the shaft, and wherein the coupler comprises a block to which the front hook is attached, the block having a rounded end and a cylindrical bore through a thickness dimension thereof concentric with the rounded end for receiving the elongated shaft therethrough and with an arcuate slot formed through the rounded end leading to the arcuate slot into the elongated shaft such that the elongated shaft can be rotated through a predetermined angle before the front hook will rotate with the elongated shaft.

2. The ladder rack of claim 1 and further including a crank arm coupled to an end of the elongated shaft at an articulated joint.

3. The ladder rack of claim 1 and further including a rear post extending generally perpendicular to the rear crossbar member at a location closely adjacent the rear ladder hook when the rear ladder support bar is in its position atop the vehicle roof area.

4. The ladder rack as in claim 2 and further including a lockable clamp affixed to the elongated shaft for receiving and retaining a portion of the crank arm when the rear ladder support bar is in its position atop the vehicle roof area.

5. The ladder rack as in claim 1 wherein the predetermined angle is 130 degrees.

6. The ladder rack as in claim 1 and further including a gas spring operatively disposed between the rear crossbar member and the elongated shaft for controlling the rate of rotation of the elongated shaft due to gravity forces acting on ladders being moved between the ladder loading and unloading position and the position atop the vehicle roof area.

7. The ladder rack as in claim 1 and further including a second rear ladder hook affixed to the rear ladder support bar at a distance from the at least one rear ladder hook corresponding to the width dimension of a ladder to be transported.

8. A method of loading a ladder onto the roof area of a van or pick-up truck equipped with a cap enclosing the box thereof comprising the steps of:
   a) providing a ladder rack as defined by claim 4 having its front and rear crossbar members attached to said roof area;
   b) leaning an extension ladder against the elongated shaft with the base of the ladder at a starting location on the ground next to the van or pick-up truck;
   c) sliding an upper portion of the ladder along the elongated shaft with the base at the starting location until a side rail of the ladder tips onto the front ladder hook;
   d) lifting the base of the ladder from the ground onto the rear ladder hook; and
   e) manipulating the crank arm to rotate the elongated shaft until the ladder rests on the rear ladder support bar and the front crossbar member at said position atop the vehicle roof area.

9. The method of claim 8 and further including the step of: securing the crank arm in the lockable clamp.

10. A method of unloading a ladder from a position atop a roof and of a work vehicle comprising the steps of:
   a) providing a ladder rack as defined by claim 4 having said front and rear crossbar members affixed to the vehicle roof and with a rail of said ladder resting upon the rear ladder support bar and on the front crossbar member;
   b) unclamping the crank arm from the lockable clamp;
   c) using the crank arm to rotate the elongated shaft and thereby raise the rear ladder support bar to a position where the ladder is inclined to the vertical with a rail thereof engaged by the front ladder hook and the rear ladder hook;
   d) lifting the base of the ladder free from the rear ladder hook and resting the base on the ground; and
   e) sliding a top portion of the ladder along the elongated shaft. until the ladder rests vertically against the elongated shaft.

* * * * *